United States Patent [19]

Pence et al.

[11] 4,220,632

[45] Sep. 2, 1980

[54] REDUCTION OF NITROGEN OXIDES WITH CATALYTIC ACID RESISTANT ALUMINOSILICATE MOLECULAR SIEVES AND AMMONIA

[75] Inventors: Dallas T. Pence; Thomas R. Thomas, both of Idaho Falls, Id.

[73] Assignee: The United States of America as represented by the United States Department of Energy, Washington, D.C.

[21] Appl. No.: 504,793

[22] Filed: Sep. 10, 1974

Related U.S. Application Data

[63] Continuation-in-part of Ser. No. 284,810, Aug. 30, 1972, abandoned.

[51] Int. Cl.$^3$ .......................... B01J 8/00; C01B 21/00
[52] U.S. Cl. .................................. 423/239; 423/237; 423/403
[58] Field of Search ............... 423/239, 219, 235, 212, 423/213.2, 213.5, 213.7

[56] References Cited

U.S. PATENT DOCUMENTS

| | | | |
|---|---|---|---|
| 2,975,025 | 3/1961 | Cohn | 423/239 |
| 3,033,642 | 5/1962 | Bukata et al. | 423/219 |
| 3,279,884 | 10/1966 | Nonnenmacher et al. | 423/239 |
| 3,346,328 | 10/1967 | Sergeys et al. | 423/213.2 |
| 3,449,063 | 6/1969 | Griffing et al. | 423/213 |
| 3,454,355 | 7/1969 | Ryason | 423/239 |
| 3,476,508 | 11/1969 | Kearby et al. | 423/239 |
| 3,599,427 | 8/1971 | Jones | 423/212 |
| 3,674,429 | 7/1972 | Collins | 423/239 |
| 3,767,764 | 10/1973 | Dolbear | 423/213.7 |
| 3,895,094 | 7/1975 | Carter et al. | 423/239 |

OTHER PUBLICATIONS

Pence et al. "NO$_x$ Abatement Using Ammonia with Zeolite Catalysts," *Proceedings of the AEC Pollution Control Conference,* pp. 115–121, Oak Ridge 10/25/72–10/27/72, USAEC.

Pence et al. "Catalytic Reduction of Nitrogen Oxides", *Atomic Energy Commission Releases, U.S. Patents and Patent Applications for Licensing* p. 22, May 4, 1973.

Pence et al. "NO$_x$ Abatement Using Ammonia with Zeolite Catalysts", *Nuclear Science Abstracts,* vol. 28, p. 254, Abstract No. 2632, Jul. 31, 1973.

Pence et al. "Catalytic Reduction of Nitrogen Oxides," Atomic Energy Commission Releases, U.S. Patents and Patent Applications for Licensing, p. 27, Aug. 31, 1973.

Norton Bulletin Z-50; Norton Chemical Products Division, Akron, Ohio, 1970.

*Chemical Abstracts,* vol. 65, 1966 #16,091g.

*Industrial and Engineering Chemistry* vol. 53, No. 3, Mar. 1961, pp. 199–204.

*Primary Examiner*—Brian E. Hearn
*Attorney, Agent, or Firm*—James E. Denny; Dean E. Carlson; Frank H. Jackson

[57] ABSTRACT

Noxious nitrogen oxides in a waste gas stream such as the stack gas from a fossil-fuel-fired power generation plant or other industrial plant off-gas stream is catalytically reduced to elemental nitrogen and/or innocuous nitrogen oxides employing ammonia as reductant in the presence of a zeolite catalyst in the hydrogen or sodium form having pore openings of about 3 to 10 Å.

8 Claims, 7 Drawing Figures

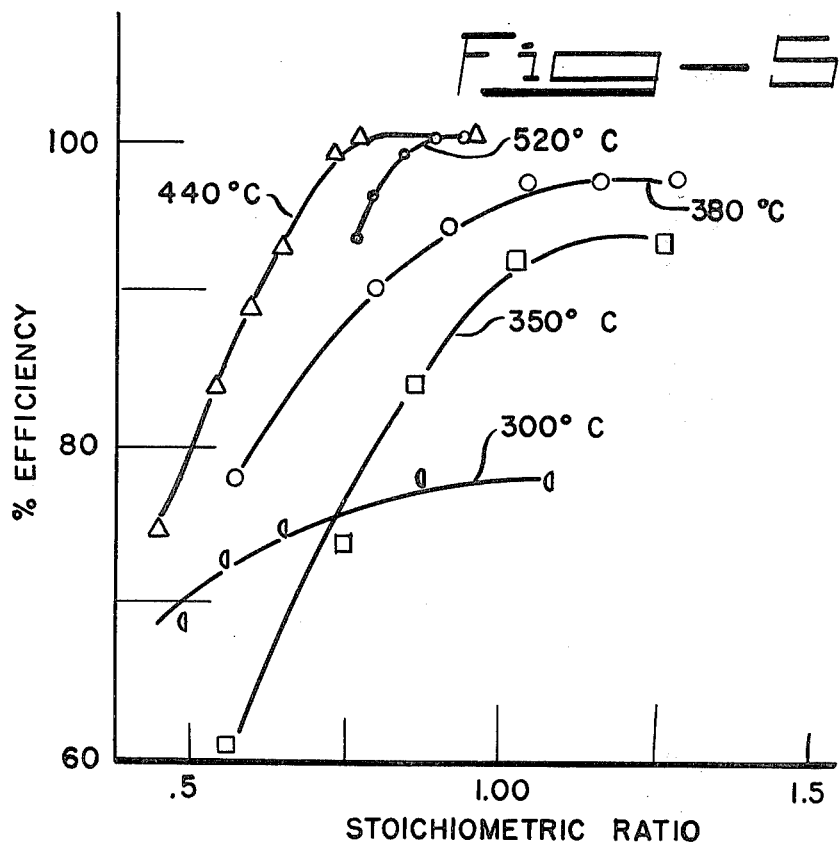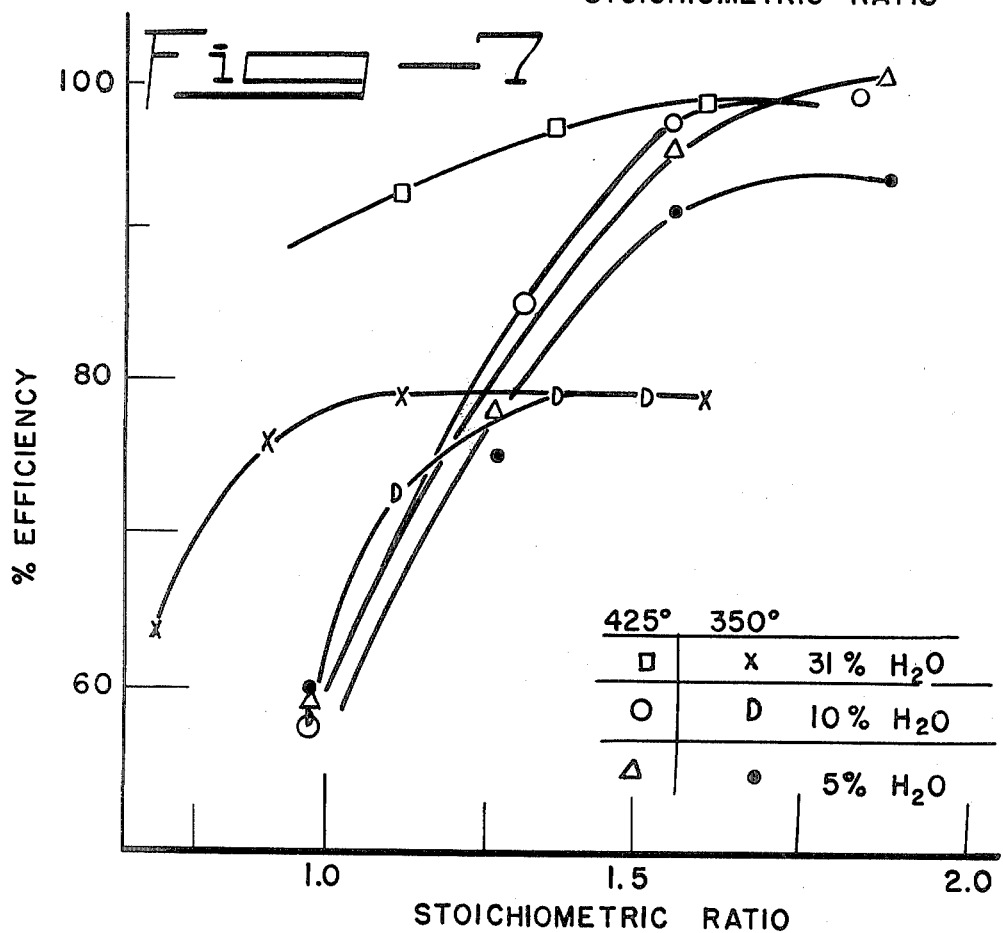

REDUCTION OF NITROGEN OXIDES WITH CATALYTIC ACID RESISTANT ALUMINOSILICATE MOLECULAR SIEVES AND AMMONIA

CONTRACTUAL ORIGIN OF THE INVENTION

The invention described herein was made in the course of, or under, a contract with the UNITED STATES ATOMIC ENERGY COMMISSION.

CROSS REFERENCE TO RELATED APPLICATIONS

This is a continuation-in-part of our application Ser. Number 284,810 filed Aug. 30, 1972, now abandoned.

BACKGROUND OF THE INVENTION

This invention relates to the catalytic reduction of nitrogen oxides. In more detail, the invention relates to the catalytic reduction of noxious nitrogen oxides present in a waste gas stream. In still more detail, the invention relates to the effective elimination of nitrogen oxides as a source of pollution from fossil-fuel-fired power generation plants and other industrial plant off-gas streams.

It it now generally recognized that the atmospheric contamination that accompanies industrial society is one of the most serious problems facing mankind and that certain nitrogen oxides contribute heavily to this problem.

There are at least six stable oxides of nitrogen but only nitric oxide (NO) and nitrogen dioxide ($NO_2$) are troublesome from a pollution standpoint and the formula $NO_x$ is generally used to refer to these two oxides. In common with other major air pollutants $NO_x$ arise chiefly from the production of energy in the community, moe specifically by the fixation of atmospheric nitrogen in high-temperature regions of furnaces and internal combustion engines. Another source of $NO_x$ as atmospheric pollutants are inorganic and organic nitration reactions in the chemical process industries. Transport, industry and electricity generation all contribute to the problem.

The corrosive character of waste gases containing nitrogen oxides may also necessitate or at least render desirable the removal of these oxides from waste gas streams, even though release of the oxides to the atmosphere can be tolerated. The presence of $NO_x$ in a waste gas stream may make it necessary to construct pollution control equipment through which the waste gas stream passes of an expensive corrosion-resistant material such as stainless steel, whereas a cheaper material such as carbon steel could be used if the $NO_x$ are removed before the waste stream enters the pollution control equipment.

Oxides of nitrogen play a dual role in air pollution, first as a pollutant in their own right and second as the initiator of complex photochemical reactions with hydrocarbons. While photochemical smog is the most visible and immediately serious consequence of $NO_x$ pollution, it is recognized that the presence of $NO_x$ in the atmosphere will adversely affect the environment even though no photochemical smog has ever been detected in the area, and the State of California has established an "adverse" level above which the concentration of $NO_x$ in the atmosphere should not be permitted to rise. Unfortunately, this "adverse" level has been substantially exceeded in many cities of the United States which rarely, if ever, have a problem with photochemical smog. It follows that oxides of nitrogen should be controlled in all cities and areas in which there is a concentration of industry in order to reduce the $NO_x$ and oxidant concentration below the "adverse" level.

There are two completely different approaches to the control of $NO_x$ emission; the first is to modify the source in such a way as to reduce the formation of oxides of nitrogen and the other is destroy or capture the nitrogen oxides already formed, thereby preventing them from escaping to the atmosphere.

Many methods for reducing $NO_x$ pollution have been suggested and a few are in practical use. Some of the suggested methods include:

Modification of original source
1. Mobile sources
   a. Changes in engine design
   b. Exhaust gas recirculation
   c. Use gas turbines rather than gasoline or diesel engines
   d. Use electric motors rather than internal combustion engines
2. Stationary sources
   a. Changes in furnace design
   b. Two-stage combustion
   c. Change in type of fuel
   d. Inclusion of additives in the fuel Removal of oxides of nitrogen
   a. Sorption by liquids, for example, ferrous sulfate or calcium hydroxide solutions
   b. Sorption by solids, for example, silica gel or molecular sieves
   c. Thermal reduction by burning in a fuel-rich flame
   d. Vapor phase reaction with other compounds. Metzler in NASA TMX-2257, March 1971, proposes that ammonia be reacted directly with oxides of nitrogen. However, potentially explosive solid ammonium nitrate is a reaction product and controlled decomposition of this ammonium nitrate has not been demonstrated.
   e. Catalytic reduction to nitrogen with or without the addition of a reducing gas. Anderson et al. in Ind. Eng. Chem., 53, 199 (1961) show that $NO_x$ can be selectively reduced by ammonia employing platinum as catalyst—a number of problems, however, have been reported with this process. First, free oxygen, even in relatively small amounts, has a tendency to poison the catalyst and, second, difficulties have been experienced in obtaining the proper conditions to prevent oxidation of ammonia prior to its use as the reducing gas.

The following patents also describe processes in which ammonia is used as a reducing gas in the presence of a catalyst.

Nonnenmacher—U.S. Pat. No. 3,279,884—Uses $V_2O_3$, $Mo_2O_3$ or $W_2O_3$ as catalyst in presence of 0–15% oxygen—Shows 99.2% removal with 3.5% oxygen present.

Griffing et al.—U.S. Pat. No. 3,449,063—Employs a copper containing catalyst such as copper oxide or support such as silica alumina.

Cohn et al.—U.S. Pat. No. 2,975,025—Suggests use of a platinum group metal in presence of 0–22% oxygen.

In addition Kearby et al.—U.S. Pat. No. 3,476,508—employs zeolites to decompose unburned hydrocarbons present in exhaust gases and states in one example that Ni-exchanged zeolites converted CO and NO under reducing conditions.

In spite of the tremendous effort that has been and is being put into this problem, the fact remains that no satisfactory procedure for practical and efficient removal of $NO_x$ from effluents that contain high levels of oxygen (3 to 20%) is now known for essentially completely destroying $NO_x$ present in a waste gas stream, such as the stack gas given off by a fossil-fuel-fired power generation plant.

SUMMARY OF THE INVENTION

According to the present invention, noxious nitrogen oxides are reduced to $N_2$ and/or $N_2O$ by mixing the stream containing noxious nitrogen oxides with a gas stream containing ammonia at a temperature of 250° to 550° C. and contacting the same with a zeolite catalyst in the hydrogen or sodium form having pore openings of about 3 to 10 Å. For example, the noxious nitrogen oxides present in stack gases containing oxygen, water vapor and sulfur dioxide may be reduced to innocuous substances by mixing the stack gas with a gas containing an effective quantity of ammonia at a temperature of 250° to 550° C. in the presence of a zeolite in the hydrogen or sodium form as catalyst.

BRIEF DESCRIPTION OF THE DRAWING

FIG. 5 is a graph in which the abatement efficiency for $NO_x$ (15% NO, 85% $NO_2$) present in a simulated Waste Calciner Facility atmosphere is plotted as a function of exit bed temperature and stoichiometric ratio of $NH_3$ to $NO_x$ for an eight-inch bed containing 1/16-inch hydrogen mordenite extrudate;

FIG. 7 is a similar graph for 100% NO and a twelve-inch bed containing ⅛-inch hydrogen mordenite extrudate.

SPECIFIC EMBODIMENTS OF THE INVENTION

Figure 1:
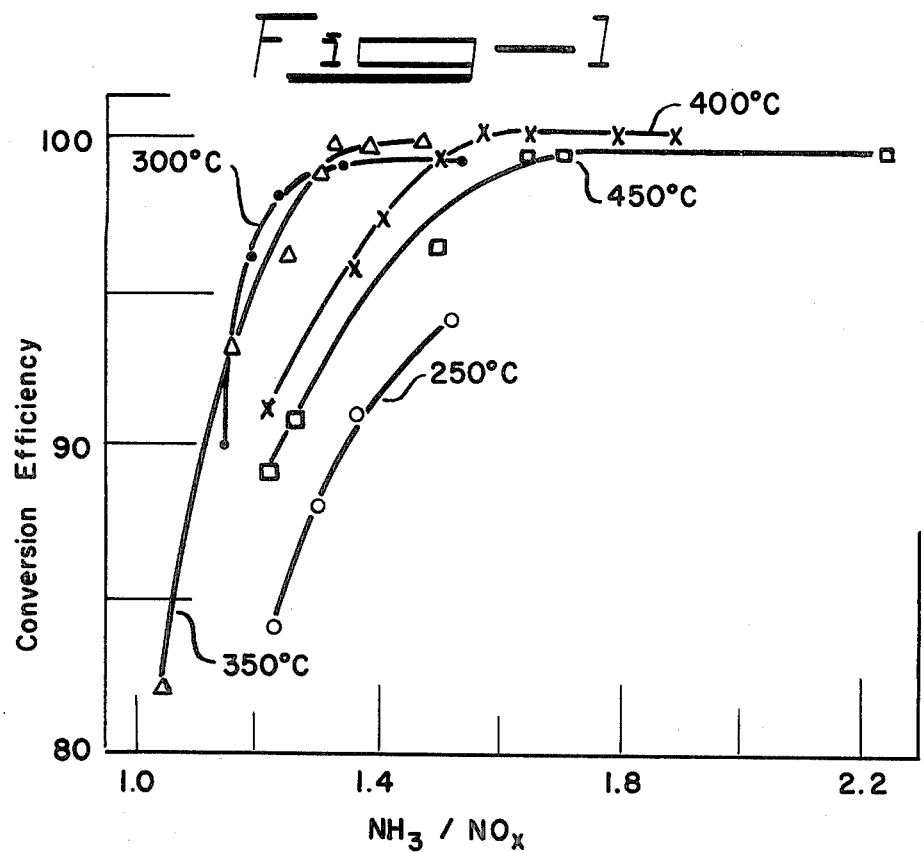
FIG. 1 is a graph in which the conversion efficiencies for the reduction of $NO_x$ present in a dry air stream and passed through a four-inch zeolite catalyst bed at a superfical face velocity of 100 ft/min. are plotted as a function of the ratio of ammonia concentration to the $NO_x$ concentration and temperature.

Under the conditions employed in our invention, noxious nitrogen oxides are reduced to nitrous oxide and/or nitrogen. The distribution of the reaction products appears to be a function of the catalyst bed temperature and the activity of the catalyst as well as of the particular reducing gas employed. Although reduction of $NO_x$ to elemental nitrogen is preferable, $N_2O$ is not an undesirable product, because it does not form an anhydride, is difficult to oxidize and is not considered to be a pollutant.

The exact reactions involved in the process of the instant invention are dependent on the composition of the gaseous mixture, and the catalytic bed operating conditions. However, the probable reactions are:

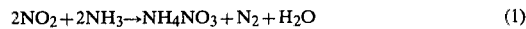
$$2NO_2 + 2NH_3 \rightarrow NH_4NO_3 + N_2 + H_2O \qquad (1)$$

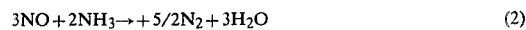
$$3NO + 2NH_3 \rightarrow + 5/2N_2 + 3H_2O \qquad (2)$$

$$NH_4NO_3 \rightarrow N_2O + 2H_2O \qquad (3)$$

$$3N_2O + 2NH_3 \rightarrow 4N_2 + 3H_2O \qquad (4)$$

The amount of ammonia employed must be sufficient to effect complete reduction of the nitrogen oxides to elemental nitrogen and/or nitrous oxide. The amount of ammonia required will fall in a range between slightly substoichiometric and slightly superstoichiometric based on complete reduction to nitrogen. If no or very little oxygen is present in the waste gas stream the small amounts of reducing gas (CO and $H_2$) present therein may reduce a part of the $NO_x$ so that less than a stoichiometric quantity of ammonia would be sufficient. If all or a major proportion of $NO_x$ is $NO_2$, the ammonia may reduce this to $N_2O$ whereby less than a stoichiometric quantity based on complete reduction to nitrogen is required. Also particularly at higher temperatures the zeolite catalyst will reduce the $NO_2$ to NO so that less ammonia is required. On the other hand, particularly at higher temperatures, competing reactions may make it necessary to employ a little more ammonia. The exact amount of ammonia required is determined by on-line continuous measurement of the $NO_x$ in the process effluent.

It is not necessary that the entire reducing gas stream have a reducing composition since the process is remarkably tolerant to the presence of molecular oxygen or other oxidizing gas. For example, the process is very effective on air streams containing up to 20 volume percent oxygen. This is a significant advantage of the process, since many currently proposed processes require that the exhaust stream have a very low oxygen content.

As will be shown hereinafter the process is also effective on humid air streams and on streams containing sulfur dioxide. This is very important since many industrial waste gas streams contain water vapor and/or sulfur dioxide.

The zeolites useful in the practice of the instant invention are alumino silicates with framework structures enclosing large cavities called supercages, which are of exceptionally large and uniform size. The fundamental structural units of zeolites are silicon and aluminum atoms tetrahedrally coordinated with four oxygen atoms. Because the oxygen atoms are mutually shared between tetrahedral units and contribute an effective unit charge to each tetrahedron, each aluminum tetrahedral unit possesses a net negative charge. Cations ae required in the framework structure to maintain charge neutrality. The cations are usually, but not always, sodium ions, and the number required per unit cell is dictated by the silicon-to-aluminum ratio of the zeolite. These cations can be replaced by other ions by ion-exchange procedures. The silicon-to-aluminum ratio and the particular cation are categorized by the type of zeolite. While any zeolite exhibiting catalytic activity could be used except for those in which the sodium has been exchanged for cations which are so active that the reducing gas decomposes before it can react with the $NO_x$ in view of the indicated utility of zeolites in the unexchanged sodium or hydrogen form and the substantially lower cost thereof than of exchanged zeolites, use only of the hydrogen and sodium forms of zeolites is contemplated in accordance with this invention.

One of the properties of zeolites is their capability of selectively adsorbing certain molecules in preference to, or to the complete exclusion of, other molecules; they, therefore are frequently known as "molecular sieves". While we do not wish to be bound by any mechanistic interpretation, it is believed that the zeolites of the instant invention function by selectively adsorbing both the nitrogen oxides and the ammonia within the pore interstices where strong electrostatic forces of the promote the reaction of the nitrogen oxide and the reducing gas. The reaction products thereby produced then exit from the zeolite framework structure. The pores of different known zeolites vary in diameter from about 3 Angstroms to about 10 Angstroms, but for any one zeolite, the pores are of substantially uniform size. Zeolites useful in the practice of the instant invention can suitably have pores ranging in size from about 3 to about 10 Angstroms when sodium is the cation. However, the pore size is altered by the exchange of cations at different size and charge. Suitable commercially available zeolites generally have particle sizes ranging from about 4 to about 20 mesh (U.S. Standard Series). If desired, the zeolite may be dispersed with an inert carrier such as alumina.

Although synthetically prepared zeolites are preferred for use in application of the instant invention because of their more uniform properties, natural zeolites can be used. Natural zeolites useful for this purpose include, primarily, the faujasites, chabazites, erionites, and mordenites.

The zeolite used must not be so active that it will oxidize the ammonia before it has the opportunity to react with the corrosive nitrogen oxides. This requirement eliminates zeolites which have been cation exchanged with metals which are known to be oxidation catalysts such as the transition metals and the noble metals. For example, 2% platinum exchanged Y-type zeolite, a synthetic faujasite with a slightly larger Si/Al ratio than the X-type, was used with $NO_2(\sim 1\%)$ and ammonia in an air stream at about 300° C. The ammonia was oxidized by $O_2$ before the $NO_2$ could be reduced.

The zeolite may be cation exchanged with a metal which is not known to be an oxidation catalyst such as silver and fully-exchanged silver zeolite, type X, has been shown to be effective (see below). It is believed however that the silver takes no part in the reaction since it is clear that zeolites in the unexchanged hydrogen or sodium form are equally effective. Unexchanged catalysts are exceptionally advantageous not only because they will not catalyze oxidation of the ammonia but also because they are not poisoned by constituents such as $SO_2$ which are frequently present in effluent gas streams. Preferred catalysts according to the present invention are synthetic hydrogen mordenites such as Zeolon 900, a product of the Norton Chemical Company, since the mordenites are more acid resistant than are other zeolites due to the higher silicon to aluminum ratio thereof and since hydrogen mordenite is apparently of slightly greater strength than is sodium mordenite.

As will become apparent hereinafter the hydrogen mordenites are effective in catalyzing the reduction of $NO_x$ with $NH_3$ in air streams containing up to 15,000 ppm $NO_x$, up to 20% $O_2$, up to 31% water, and up to 3000 ppm $SO_2$. All of these variables, as well as the relative proportion of NO and $NO_2$ in the gas stream, will effect the temperature at which a reasonable degree of $NO_x$ abatement is attained. However, acceptable working conditions can be found regardless of how these parameters vary.

Although the zeolites function effectively for prolonged periods, their useful life, like that of virtually all catalysts, is, of course, not indefinite. However, unlike many of the other catalysts heretofore proposed for the reduction of the corrosive oxides of nitrogen, the zeolites can be suitably restored to substantially full catalytic activity by regeneration methods including high-temperature "burn off", i.e. heating to about 800° C. in the presence of oxygen, or purging with high-pressure steam. The degree of regeneration and number of regenerative cycles possible depend on the type of zeolite base, type and degree of exchange, and the extent and type of contaminant on the catalyst bed. Even without regeneration, the zeolites function effectively for a longer period of time than known prior art nitrogen oxide reduction catalysts.

While it is known that a reaction proceeds between $NO_x$ and $NH_3$ in the absence of a catalyst as shown in the prior art, use of a zeolite as catalyst in accordance with the present invention permits greater reaction efficiency, less ammonia consumption and ensures the controlled thermal decomposition on the catalyst of the potentially explosive ammonium nitrate formed during the reaction.

One of the important advantages of the process of the instant invention is that very high conversion rates are achieved. Under appropriate operating conditions, as will be described, essentially all, i.e. >98%, of the corrosive nitrogen oxides in the gas stream will be reduced to elemental nitrogen or $N_2O$.

As previously mentioned, the process of the instant invention can suitably be effected by maintaining the zeolite catalytic bed at a temperature ranging from at least 250° C. to about 550° C. The exact temperature required to attain the desired reduction depends on the type of zeolite, the composition of the effluent gas, and residence time; generally, there is no advantage to exceeding the minimum temperature. However, if the concentration of unburned hydrocarbons in the gas stream is high, operation of the catalyst bed at higher temperatures will prolong its effective life. The reaction pressure is also not critical, pressures from atmospheric to about 150 psig being particularly suitable.

The contact or residence time of the corrosive nitrogen-oxide-containing gas stream plus the reducing gas with the zeolite catalyst can be as low as about 0.1 second for essentially complete reduction of the corrosive nitrogen oxides. Longer contact times are, of course, not harmful, but as in virtually all processes of this type, the minimum effective contact time, which enables the maximum through-put rate, is preferable. The volume ratio of corrosive nitrogen oxides through-pilot to zeolite also is not critical. We have found that with quantities of zeolites as low as 1 part by volume per 10 standard volumes of nitrogen oxide through-put per minute, essentially complete reduction of the corrosive nitrogen oxides is achieved. As is apparent, this ratio refers to the noxious nitrogen oxide through-put; the total gas stream through-put can, of course, by many orders of magnitude greater since in most gas streams, including power-generating-plant effluents and automobile exhaust, the amount of noxious nitrogen oxides is usually low. For example, the corrosive nitrogen oxide concentrations in fossil-fuel-power-generating facilities, incinerators, or other combustion unit off-gases are usually less than 700 ppm, while the maximum concentration in internal combustion engine exhaust is less than 4000 ppm and usually less than 2000 ppm.

As previously mentioned, to effect the reduction of the corrosive nitrogen oxides, there must be present at least an effective amount of reducing gas. The required amount of reducing gas can be added to the gas stream at any point prior to contacting the gas stream with the zeolite catalyst. The only requirement is that a sufficient quantity of the reducing gas be fairly well mixed with the gas stream prior to contacting the zeolite catalyst.

The invention can be more fully understood by reference to the following examples.

EXAMPLES

A series of preliminary experiments were conducted to ascertain the effectiveness of various commercially available synthetic zeolites as catalysts for the reduction of the corrosive oxides of nitrogen. Unless otherwise stated, the percent composition of the gases refers to volume percents and all input temperatures were at ambient temperatures ($\sim 21°$ C.).

The following abbreviations are used in the examples when referring to the type of zeolites:

NaX—Type X zeolite, sodium cation, a synthetic faujasite-type zeolite manufactured by both Union Carbide Corp. and Grace Chemical Corporation.

AgX—X-type zeolite in which the sodium ions have been replaced by ion exchange with silver.

AW500—A reprocessed natural zeolite containing mostly sodium cations.

NaZ—A synthetic mordenite called "Zeolon" manufactured by Norton Chemical Corporation.

(1)

Catalyst Material
   100% AgX
   12-14 mesh
   $\sim 17$ cm$^3$
Operating Conditions
   Flow rate—7.6 l/min
   Bed Temp.—200° to 250° C.
   Residence time—$\sim 0.15$ sec
Input
   $NO_2$—1.0%
   $NH_3$—$\sim 1.9$%
   Air—remainder
Output
   $NO_2$—$<0.01$%
   NO—$<0.01$%
   $N_2O$—0.3%

(2)

Catalyst Material
   100% NaX
   12-14 mesh
   $\sim 50$ cm$^3$
Operating Conditions
   Flow rate—7.6 l/min
   Bed Temp.—275° to 325° C.
   Residence time—0.4 sec
Input
   $NO_2$—1.0%
   $NH_3$—$\sim 1.9$%
   Air—remainder
Output
   $NO_2$—$<0.01$%
   NO—$<0.01$%
   $N_2O$—0.8%

(3)

Catalyst Material
   AW 500—primarily sodium
   12-14 mesh
   $\sim 50$ cm
Operating Conditions
   Flow rate—7.6 l/min
   Bed temp.—275° to 325° C.
   Residence time—0.4 sec
Input
   $NO_2$—1.0%
   $NH_3$—$\sim 1.9$%
   Air—remainder
Output
   $NO_2$—$<0.01$%
   NO—$<0.01$%
   $N_2O$—0.6%

(4)

Catalyst Material
   NaZ
   12-14 mesh
   $\sim 50$ cm
Operating Conditions
   Flow rate—7.6 l/min
   Bed temp.—300° to 325° C.
   Residence time—0.4 sec
Input
   $NO_2$—1.0
   $NH_3$—$\sim 1.9$%
   Air—remainder
Output
   $NO_2$—$<0.1$%
   NO—$<0.1$%
   $N_2O$—0.8%

In summary, the results of the table show that when ammonia is used in conjunction with several of the zeolite catalysts: (1) only relatively low temperatures are required, 250° to 300° C., for NO and $NO_2$ conversion; (2) the catalyst allows selective reduction of NO and $NO_2$ with the controlled decomposition of the ammonium nitrate; and (3) satisfactory conversion rates are obtained even in relatively oxygen-rich ($\sim 19$ percent) systems.

Many tests have been performed subsequently to those described above. The following tests were performed on a simulated flue gas atmosphere containing about 5000 ppm $NO_x$, which was predominantly $NO_2$ (less than 200 ppm NO). The humidified air streams contained 9 to 10% water vapor (dew point of about 46° C.), and the dry air streams contained about 1% water vapor. Four- and 8-inch catalyst bed depths were used with residence times of 0.2 and 0.4 seconds, respectively. These correspond to space velocities of 18,000 and 9,000 hr$^{-1}$. The specific zeolite catalyst studied were 1/16-inch extrudate synthetic hydrogen and sodium mordenites (Zeolon). Because of its apparently slightly greater strength, the hydrogen form was selected for use in generating the data reported in this paper.

Figure 2:
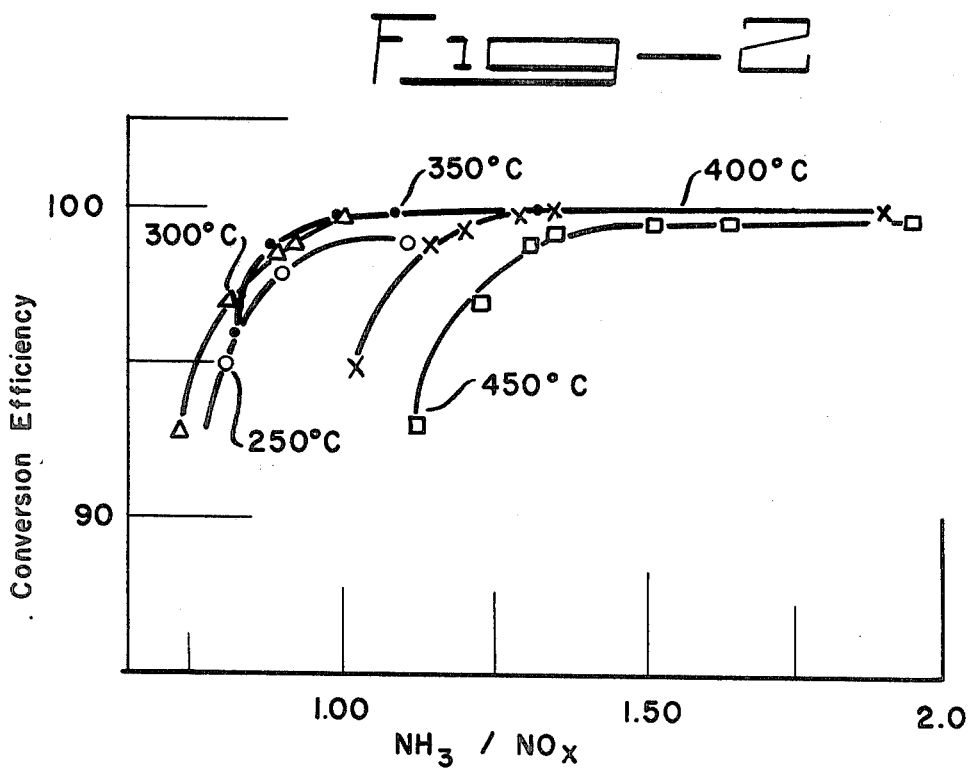
FIG. 2 is a similar graph for an eight-inch catalyst bed.

FIGS. 1 and 2 show the results of data collected using 4- and 8-inch deep catalyst beds, 100 ft/min face velocity, and dry influent air. The indicated conversion efficiency is based on the reaction:

$$3NO_2 + 4NH_3 \rightarrow 7/2 N_2 + 6H_2O \qquad (5)$$

In generating these data, up to several hours were used to equilibrate the $NO_x$—$NH_3$ catalyst system. As expected, these data indicate a significant improvement in conversion efficiency when comparing the results from the 8-inch deep catalyst bed with those from the 4-inch deep bed. Efficiencies as high as 99.9% were observed at catalyst bed temperatures in the range 300° to 400° C. The influent $NO_x$ streams were reduced to at least 2 ppm $NO_x$, which was the background level of the monitor. Measurements were made for both $NH_3$ breakthrough and oxidation of $NH_3$ to $NO_x$ at high $NH_3$ to $NO_x$ ratios and temperatures in the range 400° to 450° C., but no significant amounts of either species were observed. At the lower temperatures of 300° to 350° C., small amounts of $NH_3$ were observed to breakthrough the catalyst bed when the conversion efficiencies were in the range 99 to 99.9%. At even lower temperatures, below 300° C., considerable amounts of $NH_3$ were detected in the catalyst bed effluents, but quantitative data were not collected.

Figure 3:
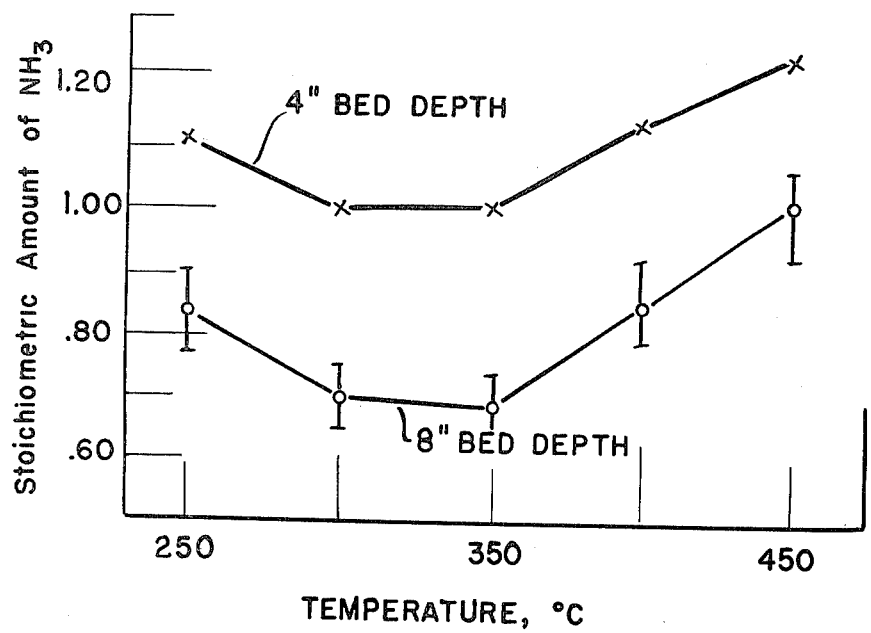
FIG. 3 is a graph in which the ammonia required for 99% conversion of about 5000 ppm $NO_2$ present in a dry air stream and passed through a zeolite catalyst bed at a face velocity of 100 ft/min. is plotted as a function of temperature.

The amount of $NH_3$ required to obtain 99% conversion efficiency of $NO_x$ in dry air at a face velocity of 100 ft/min and 4- and 8-inch deep beds is illustrated in FIG. 3. The stoichiometry refers to Reaction (5). With the 8-inch deep bed, 99% conversion efficiencies were obtained from 250° to 450° C. The 4-inch deep bed performed nearly as well but required slightly more $NH_3$. In both beds some $NH_4NO_3$ was observed in the effluent when the catalyst bed was operated below about 275° to 300° C., but it was not present above this temperature range.

Considering only the amount of $NH_3$ required, the process was most efficient when the catalyst bed was operated in the temperature range of 300° to 350° C. There are several reasons why conversion efficiencies of 99% were obtained at less than the apparent stoichiometric amount of $NH_3$. First, in the temperature range of about 275° to 375° C., incomplete reduction of the $NO_x$ occurred resulting in some formation of $N_2O$ instead of all to elemental nitrogen, thus, requiring less $NH_3$. Second, we have observed that the zeolite catalyst will reduce $NO_2$ to NO even in the absence of $NH_3$ above about 300° C., but the efficiency of the reaction does not appear to be appreciable until about 350° C.; at 400° C. the conversion efficiency of $NO_2$ to NO is about 90%. Therefore, these two processes tend to reduce the amount of $NH_3$ required for complete reduction of $NO_x$ to $N_2$. Also, when the catalyst bed was operated above 400° C., large excesses, 30 to 50% above that required for 99% conversion, could be used without being detected in the effluent, indicating the excess $NH_3$ was being oxidized in the catalyst bed. However, inasmuch as no significant amounts of $NO_2$, NO, or $N_2O$ were observed in the effluent at these conditions, the oxidation product must be $N_2$, and the reduction reactions of the $NO_x$ to $N_2$ by $NH_3$ occurs in preference to oxidation of $NH_3$ . . . at least over the temperature range studied, 400° to 450° C. Because several reactions may take place concurrently, the exact description of the overall process mechanism is not clear, but the net result is a very efficient reduction process with no adverse by-products.

Figure 4:
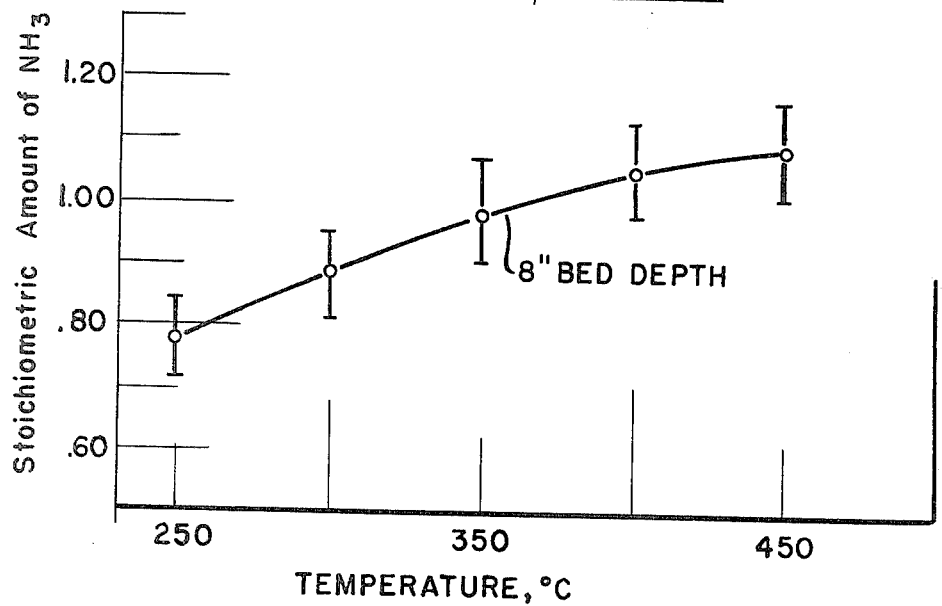
FIG. 4 is a similar graph for a humid air stream (dew point of 46° C.)

FIG. 4 shows the results of tests conducted in humidified air streams with all other conditions the same as those of the dry air stream shown in FIG. 3. Although no difficulty was encountered in obtaining greater than 99% $NO_x$ conversion efficiency in the humidified air stream, more $NH_3$ was required than with the dry air tests.

The error bars shown in FIGS. 3 and 4 indicate the uncertainty in the $NO_2$ standard. The standard was assumed to be 4750 ppm $NO_2$ with an upper limit of 5100 ppm and a lower limit of 4400 ppm. Other systematic measurement errors are not believed to exceed ±5%.

The following tests were performed on a simulated test atmosphere typical of coal-fired power plants.

The catalytic effect of the hydrogen form of Zeolon-900 on the reaction efficiency of NO and $NH_3$ was studied in a flow system. A vertical 2.2-inch i.d. quartz tube containing a 12-inch bed of the ⅛-inch extrudate catalyst was heated to 350° C. with a tube furnace. A simulated flue gas, which was preheated to the bed temperature, was passed through the bed at a rate of 2.65 ft$^3$/min (measured at 70° F. and 1 atm), producing a superficial face velocity of 100 ft/min. The test gas consisted of 0.3% $SO_2$, 0.05% NO, 12% $CO_2$, 7% $H_2O$ and the remainder air. Combustion stack gases usually contain 3 to 7% $O_2$ as compared with the 16% used here; however, the high flow rate of the test mixture made the use of bottled $N_2$ impractical. Therefore, plant air was used resulting in the higher $O_2$ content. The water vapor content was monitored with a psychrometer, and rotameters were used to measure the required flow of the other gases that made up the test atmosphere. Thermocouples positioned every two inches along the vertical axis of the bed indicated that the temperature gradient was less than 68° F. throughout the test bed. The pressure drop across the bed was 12.9 inches of $H_2O$.

After the bed had been exposed to the test atmosphere for 12 hours, the $NH_3$ was introduced upstream of the bed. At first, a six-hour equilibration period was required to attain a constant effluent NO reading; but thereafter, only one hour was needed with each small change in the influent $NH_3$ concentration. The test was conducted continuously for about 200 hours. During this time a desired influent concentration of $NH_3$ was selected, and NO effluent data collected for three to six hours before changing to another setting. Effluent NO, $NO_2$, $N_2O$, and $NH_3$ concentration data were collected throughout the test period.

The NO abatement efficiencies of this process, as a function of the influent $NH_3$ concentration, are given in Table 1.

TABLE 1.

Nitric oxide abatement efficiency versus $NH_3$ concentration at a bed temperature of 660° F., influent NO concentration of 500 ppm, and space velocity of 6000 hr$^{-1}$.

| Influent $NH_3$(ppm) | Effluent NO (ppm) | Abatement efficiency (%) | Stoichiometric amount of $NH_3$ |
|---|---|---|---|
| 334 | 41.9 | 91.6 ± 1.3 | 1.0 |
| 367 | 24.3 | 95.2 ± 1.4 | 1.1 |
| 400 | 7.7 | 98.5 ± 0.2 | 1.2 |
| 467 | 6.9 | 98.6 ± 0.2 | 1.4 |

Data collection was limited to influent levels of $NH_3$ which yielded greater than 90% removal of NO. As indicated in column three, the data were highly reproducible, and no decrease in catalyst activity was noted during the 200-hour test period. Under these conditions, the maximum abatement efficiency of the system, which occurred with a 20% excess of NH₃, was about 98.5%. The stoichiometric calculations were based on the reaction $$3NO + 2NH_3 \rightarrow 3H_2O + 5/2\ N_2 \tag{6}$$

which is assumed to be the predominant one occurring. The other monitored species, NO₂, N₂O, and NH₃, were not detected in the effluent at any time. A white crystalline compound was observed in the effluent. This material was analyzed by x-ray crystallography and determined to be a mixture of ammonium bisulfate (NH₄HSO₄) and ammonium sulfate [(NH₄)₂SO₄].

The results of these test data show the zeolite catalyst to exhibit a remarkable ability to selectively promote the NO—NH₃ reaction in the presence of potentially interfering processes, such as premature oxidation of NH₃ by O₂, blocking of active sites by high concentrations of H₂O and CO₂, and catalyst poisoning by SO₂.

The formation of NO₂ is not kinetically favored anywhere in the test or sampling system. Calculations indicate that less than 1% of 500 ppm NO in air will be converted to NO₂ in 4 sec at 68° F. and in 12 sec at 668° F. The residence time of the test gas is about 4 sec total in the test apparatus and sampling system. Therefore, NO₂ should not have been observed; such was the case. It was considered possible that the reaction $$4NO + NH_3 + 5/2\ N_2O + 3/2\ H_2O \tag{7}$$

would compete with reaction (6), but these data indicate that this reaction occurs only as an intermediate step, if at all.

The absence of NH₃ in the effluent, when the influent stoichiometric ratio of NH₃/NO was 1.40, and the presence of ammonium bisulfate and sulfate in the effluent indicate that the following reactions are competing with reaction (6):

$$2SO_2 + O_2 \rightarrow 2SO_3 \tag{8}$$

$$SO_3 + H_2O + NH_3 \rightarrow NH_4HSO_4 \tag{9}$$

$$SO_3 + H_2O + 2NH_3 \rightarrow (NH_4)_2SO_4 \tag{10}$$

Under these conditions it is apparent that the reaction between NH₃ and NO is kinetically more favorable than between NH₃ and SO₂, especially when one considers that the influent SO₂/NO ratio is about 6. The formation of the ammonium bisulfate and sulfate as reaction products was not surprising. In previous investigations the possibility of SO₂ abatement by ammonia in the absence of NO was examined, and a conversion efficiency of about 80% of the SO₂ to ammonium sulfate was obtained. The sulfate/bisulfate product ratio will depend in part on the amount of NH₃ which is available for reaction with SO₃. Thus a conceptually attractive and simple combined NO$_x$—SO$_x$ abatement system would involve injection of NH₃ upstream of a single bed of mordenite maintained at about 660° F. This could simultaneously catalyze the reduction of NO$_x$ to N₂ and convert the SO$_x$ to particulate ammonium sulfate or ammonium bisulfate which could be removed with electrostatic precipitation.

Further tests were carried out on a test atmosphere containing 31% H₂O, 5% CO₂ and 2% CO which is typical of the effluent gas from the Waste Calciner Facility at the National Reactor Test Station. The following experimental conditions were used:

(a) Catalyst—hydrogen form of Zeolon 900.
(b) Bed Depth—12 in with the ⅛ in extrudate and 8 in with the 1/16 in in extrudate.
(c) Test Atm—31% H₂O + 5% CO₂ + 2% CO + air.
(d) Temperature Range—300° to 550° C. at the bed exit.
(e) Face Velocity—100 ft/min at scfm.
(f) Residence Time—0.6 sec in the 12-in bed and 0.4 sec in the 8-in bed.
(g) NO$_x$ Concentration—usually about 5000 ppm but up to 15,000 ppm.
(h) Bed Press. Drop—30 to 42 mm Hg in the temperature range 300° to 550° C.
(i) Bed Temperature Gradients—about a 40° C. increase in the direction of gas flow with 5000 ppm NO$_x$ and 100° C. with 15,000 ppm NO$_x$.

Figure 6:
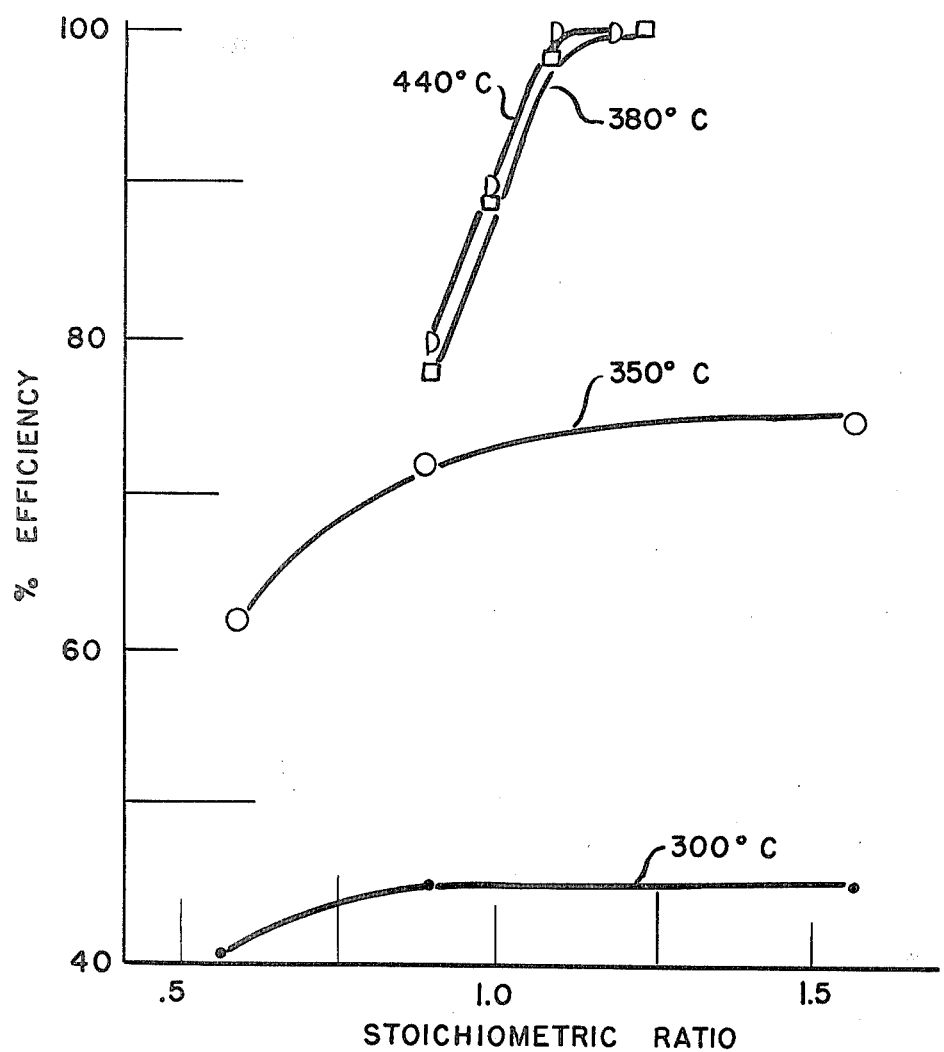
FIG. 6 is a similar graph for 100% NO.

FIGS. 5 and 6 illustrate the data obtained from the eight inch bed. As indicated, pure NO₂ test atmospheres were not obtainable. This is probably due to some thermal dissociation in the preheating stage of the gas. Th data indicate a pronounced difference in the behavior of NO and NO₂ between 300° and 380° C. The reaction efficiencies for NO are more temperature dependent than for NO₂. Also, better abatement efficiencies are obtained for NO₂ with regards to both maximum efficiency and NH₃ required at comparable temperatures. Other data was also collected with the eight inch bed:

(a) Greater than 99% abatement of 15,000 ppm NO₂ was obtained with an exit bed temperature of 550° C.
(b) Below 350° C. about 20% of the influent NO₂ appeared as N₂O in the effluent. Above 440° N₂O was not detected and at no temperature was N₂O detected when the influent contained only NO.
(c) An effect on abatement efficiency as a function of CO or CO₂ concentration was not observed.
(d) A water effect was observed. At 380° C. the maximum NO₂ abatement efficiencies were 97, 99.3 and 99.9% for a water vapor content of 31, 10 and 1% respectively.

FIG. 7 illustrates the data obtained using the 12-inch bed. A comparison of this data with FIG. 6 indicate that maximum obtainable efficiencies are about the same but that considerably more NH₃ is required when using the larger extrudate. Of perhaps greater interest is the water effect on the curves. There is a positive effect at low stoichiometric ratio which changes to a negative effect at the higher ratios as the water content is increased. The maximum obtainable efficiency is not greatly affected at the high temperature but very much so at the lower temperature.

It will be noted that the data in FIG. 7 indicate a maximum efficiency somewhere between 80 and 93% for 7% water content at 350° C. The data from examples described above indicates an efficiency of better than 98% when the bed was operated at 350° C. and the effluent contained 500 ppm NO and greater than 99% efficiency between 300° and 450° C. for 5000 ppm NO₂ in air + 10% H₂O. While some of the differences are due to differences in the test atmosphere, it is possible that the exit bed temperatures in the earlier tests were slightly higher (possibly up to 50°) than the measured temperatures due to lack of sophisticated temperature measuring devices.

Based on the above data recommended temperatures of operation are:

(1) For a waste gas stream typical of the Waste Calciner Facility effluent consisting of air, 30 volume percent water vapor, 5 volume percent CO, 2 volume percent CO, 0.9 volume percent $NO_2$ and 0.4 volume percent NO—400°–500° C.

(2) For a waste gas stream typical of a particular industrial waste gas stream consisting of air, 10 volume percent water vapor, and 0.5 volume percent $NO_2$—350° C.

(3) For a waste gas stream typical of a fossil-fuel-fired power plant consisting of air, 7 volume percent water vapor. 0.3 volume percent $SO_2$, 12 volume percent $CO_2$ and 0.05 volume percent NO—350° C.

In general temperatures of operation can range from 250° or 300° to 550° C. with the minimum being dependent upon the composition of the waste gas stream.

In summary, zeolite catalysts offer the following advantages over other catalysts: (1) the synthetic zeolites do not cause the premature oxidation of ammonia even at oxygen concentrations as high as 20% and temperatures as high as 400° C., (2) the process is operable over a wider temperature range, 250°–550° C. (3) the use of zeolite catalysts require only near-stoichiometric quantities of ammonia compared with large excesses usually required for other catalysts, (4) the catalysts are not susceptible to poisoning by contaminant gases and perform well even in highly humid atmospheres, and (5) they provide very high efficiencies, greater than 99%, for $NO_x$ reduction at space velocities and catalyst bed pressure drops that are practical for industrial applications.

In addition to being highly efficient, the process eliminates the following disadvantages associated with liquid scrubber processes: (1) disposal of liquid wastes generated in the scrubbing process, (2) the requirement for equimolar mixtures of NO and $NO_2$ to ensure good removal efficiencies, (3) relatively low throughput rates, and (4) the need to reheat the treated gas to obtain good dispersal of the stack discharge. Also the process does not require the high energy requirements of thermal decomposition methods. Finally, the process should with minor modification be useful for combined $SO_2$ and $NO_x$ removal from waste gas streams.

The embodiments of the invention in which an exclusive property or privilege is claimed are defined as follows:

1. A process for converting more than 98% of the noxious nitrogen oxides present in gaseous effluents containing 3 to 20 volume percent oxygen to $N_2$ and $N_2O$ comprising mixing the gaseous effluent with a gas stream containing an effective amount of ammonia and contacting the mixed gases with a catalyst consisting essentially of a synthetic hydrogen mordenite having pore openings of 3 to 10 Å, the temperature of the catalyst bed being 250°–550° C. at the bed exit.

2. A process according to claim 1 wherein the gaseous effluent contains 16 to 20% oxygen.

3. A process according to claim 1 wherein the gaseous effluent is stack gas from a fossil-fuel-fired power plant including the following: 7 volume percent water vapor, 12 volume percent $CO_2$, 0.3 volume percent $SO_2$ and 0.05 volume percent NO, and 3 to 7 volume percent $O_2$ and the bed temperature is 350° C. at the bed exit.

4. A process according to claim 1 wherein the gaseous effluent is stack gas from a nuclear processing plant having the following approximate composition: 30 volume percent water vapor, 5 volume percent $CO_2$, 2 volume percent CO, 0.9 volume percent $NO_2$, 0.4 volume percent NO, the balance being air and the bed temperature is 400°–500° C. at the bed exit.

5. A process according to claim 1 wherein the gaseous effluent is stack gas from an industrial plant having approximately the following composition: 10 volume percent water vapor, 0.5 volume percent $NO_2$, the balance being air and the bed temperature is 350° C. at the bed exit.

6. A process for selectively reducing oxides of nitrogen present in a mixture of gases containing oxygen, reducible oxides of nitrogen and an inert gas, which comprises contacting in a reaction zone said mixture of gases and an approximately stoichiometric amount of ammonia based on reduction of the nitrogen oxides present to nitrogen at a temperature of 250° to 550° C. in the presence of a catalyst consisting of an acid resistant aluminosilicate molecular sieve having substantially uniform intercrystalline pores whereby selective reduction of the oxides of nitrogen to nitrous oxide and nitrogen is effected.

7. A process for selectively reducing oxides of nitrogen in a mixture of gases containing up to 20% oxygen, up to 1.0% NO or $NO_2$ and the remainder an inert gas, which comprises contacting in a reaction zone said mixture of gases and an approximately stoichiometric amount of ammonia based on reduction of nitrogen oxides present to nitrogen at a space velocity of less than 36,000 hr $^{-1}$ and a temperature within the range of 250° C. to 550° C. in the presence of a catalyst consisting of an acid resistant aluminosilicate molecular sieve composition having substantially uniform intercrystalline pores with diameters of about 3 to 10 A, whereby selective reduction of the oxides of nitrogen to nitrous oxide and nitrogen is effected.

8. A process for selectively reducing oxides of nitrogen in a mixture of gases containing up to 20% oxygen, from a trace to 2% oxides of nitrogen and the remainder an inert gas, which comprises contacting in a reaction zone said mixture of gases and an approximately stoichiometric amount of ammonia based on reduction of nitrogen oxides present to nitrogen at a space velocity of less than 36,000 hr $^{-1}$ and at a temperature within the range of 250° C. to 550° C. in the presence of a catalyst consisting of an acid resistant aluminosilicate molecular sieve composition having substantially uniform intercrystalline pores with diameters of about 3–10 A, whereby selective reduction of the oxides of nitrogen to nitrous oxide and nitrogen is effected.

* * * * *